United States Patent

Sabin et al.

[11] Patent Number: 5,793,525
[45] Date of Patent: Aug. 11, 1998

[54] APPARATUS FOR ADJUSTING THE VIEWING ANGLE OF A MICROSCOPE

[75] Inventors: Jeffrey M. Sabin, Lewiston; Christopher L. Wyatt, Corfu; Mark R. King, Akron, all of N.Y.

[73] Assignee: Leica Inc., Depew, N.Y.

[21] Appl. No.: 532,522

[22] Filed: Sep. 22, 1995

[51] Int. Cl.⁶ .................. G02B 21/20; G02B 21/00
[52] U.S. Cl. .................. 359/384; 359/368; 359/375
[58] Field of Search .................. 359/368, 373–377, 359/383, 384

[56] References Cited

U.S. PATENT DOCUMENTS

| | | | |
|---|---|---|---|
| 4,175,826 | 11/1979 | Blaha et al. | 359/384 |
| 4,299,439 | 11/1981 | Shamblad | 359/384 |
| 4,412,727 | 11/1983 | Taira | 359/384 |
| 4,486,078 | 12/1984 | Hashimoto et al. | 359/381 |
| 4,576,450 | 3/1986 | Westphal | 359/384 |
| 4,597,644 | 7/1986 | Schindl | 359/384 |
| 4,605,287 | 8/1986 | Lang et al. | 359/384 |
| 4,652,094 | 3/1987 | Kitajiwa | 359/375 |
| 5,177,636 | 1/1993 | Furuhashi | 359/384 |
| 5,319,493 | 6/1994 | Goldsmith | 359/368 |
| 5,532,872 | 7/1996 | Sakamoto et al. | 359/384 |
| 5,589,977 | 12/1996 | Lucke et al. | 359/375 |

*Primary Examiner*—Thong Nguyen
*Attorney, Agent, or Firm*—Bean, Kauffman & Snyder

[57] ABSTRACT

An apparatus for adjusting a viewing angle of a microscope is disclosed. In a preferred embodiment thereof, a bent eyepiece tube includes a prism on a first optical axis thereof for redirecting an object image to a second optical axis of the tube on which a magnifying eyepiece is aligned. The eyepiece tube is mounted on the microscope for rotation about the first optical axis by a collar, and a spring plunger carried by the tube is biased for respective engagement with a pair of opposing recesses in the collar to releasably secure the eyepiece tube in predetermined rotational positions corresponding to a pair of different viewing angles.

18 Claims, 3 Drawing Sheets

APPARATUS FOR ADJUSTING THE VIEWING ANGLE OF A MICROSCOPE

BACKGROUND OF THE INVENTION

A. Field of the Invention

The present invention relates generally to microscopes, and more particularly to an apparatus for adjusting a viewing angle of a microscope.

B. Description of the Prior Art

The ergonomic benefits associated with providing adjustability of a viewing angle of a microscope have long been recognized, as evidenced by the variety of prior art mechanisms aimed at achieving greater user comfort by enabling users to selectively adjust viewing angle.

For example, as described in U.S. Pat. No. 4,597,644 to Schindl, it is known to provide a microscope with an optical path system comprising first and second optical components and an optical bridge between an exit optical axis of the first component and an entry optical axis of the second component which is parallel to the exit optical axis of the first component. The first and second optical components are mechanically rotated about their respective axes when viewing angle is adjusted, thereby changing the optical path by a corresponding degree.

A more recent prior art mechanism for adjusting the viewing angle of a microscope is disclosed in U.S. Pat. No. 5,319,493 and generally comprises an eyepiece connected to a flexible fiber optic housing which in turn is attached to the microscope body.

Prior art mechanisms for providing adjustable viewing angle are, for the most part, mechanically and/or optically complex. Therefore, the desirable feature of viewing angle adjustability is found predominantly in higher priced microscopes, or is attainable only by means of an expensive add-on attachment.

SUMMARY OF THE INVENTION

Therefore, it is an object of the present invention to provide an apparatus for adjusting the viewing angle of a microscope which is relatively inexpensive to manufacture.

It is another object of the present invention to provide an apparatus for adjusting the viewing angle of a microscope which is durable and simple to use.

It is a further object of the present invention to provide an apparatus for adjusting the viewing angle of a microscope which may be readily installed on a conventional microscope body.

Briefly, a preferred embodiment of the present invention comprises a bent eyepiece tube having a light entry end, a light exit end, and optical means such as a prism or mirrors fixed within the entry end. The optical means is aligned on a first optical axis for receiving an object image transmitted through the entry end and redirecting the image at an oblique angle along a second optical axis to a magnifying eyepiece slidably received at the exit end. An annular collar serves to mount the entry end of the eyepiece tube on the microscope body for rotation about the first optical axis, and detent means in the form of a spring plunger carried by the eyepiece tube and biased for engagement with a pair of opposing recesses in the collar upon alignment therewith permit the eyepiece tube to be releasably secured in respective rotational positions corresponding to a pair of different viewing angles of the eyepiece.

BRIEF DESCRIPTION OF THE DRAWINGS

The nature and mode of operation of the present invention will now be more fully described in the following detailed description taken with the accompanying drawings wherein.

DETAILED DESCRIPTION

Figure 1:
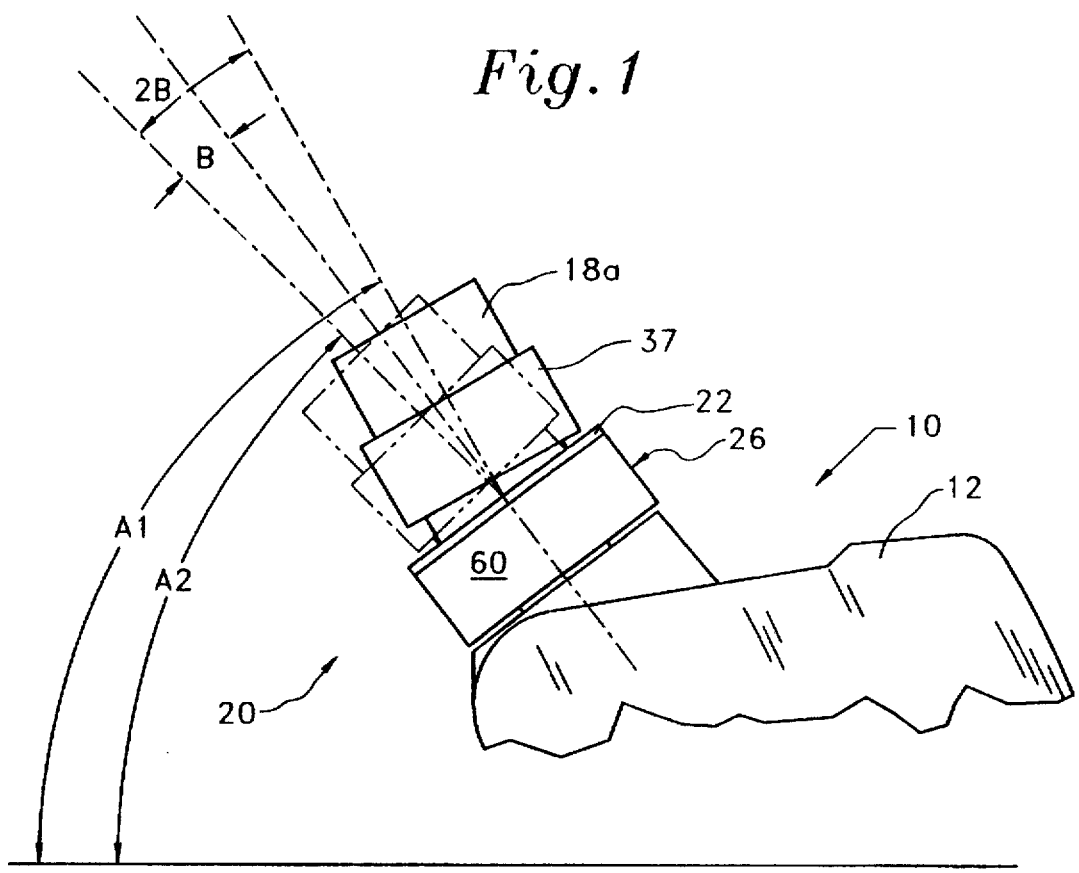
FIG. 1 is a partial side elevational view of a microscope incorporating a viewing angle adjustment apparatus formed in accordance with a preferred embodiment of the present invention, with an alternate position of the apparatus being shown in phantom line.
Figure 2:
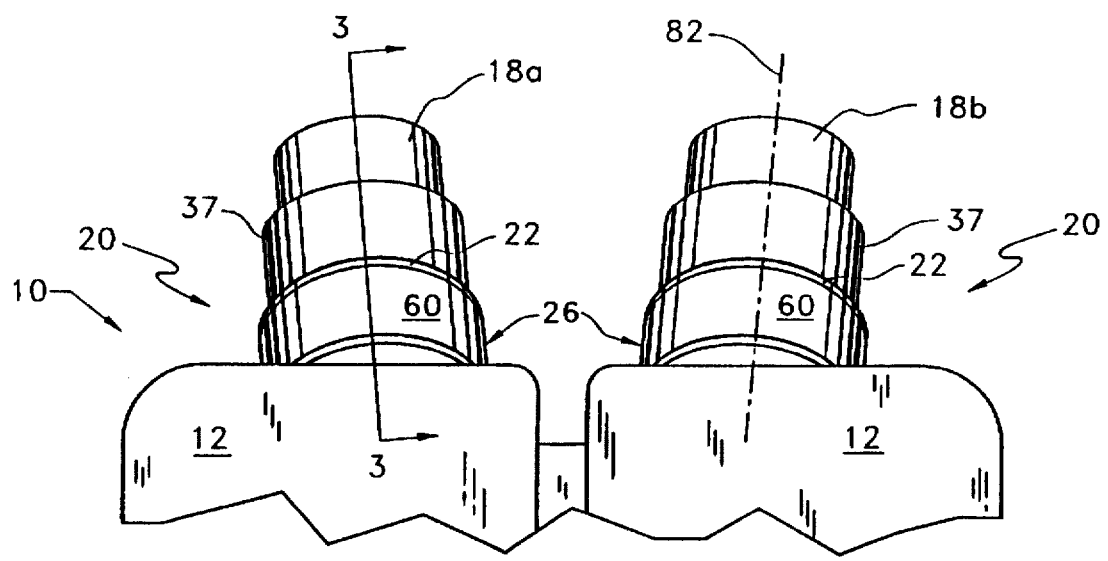
FIG. 2 is a partial front elevational view of the microscope of FIG. 1.

A microscope is partially shown in FIG. 1 and generally identified by the reference numeral 10. Microscope 10 is conventional in that it includes a body 12 supported relative to a specimen stage (not shown) on which an object to be observed may be positioned. Body 12 encloses an objective lens and an optical path system, neither being shown, for forming an image of an object and delivering the object image to a magnifying eyepiece 18a. If microscope 10 is a stereomicroscope, such as can be seen in FIG. 2, it will have another objective lens and optical path system enclosed within body 12 for forming an additional object image and delivering the additional object image to another eyepiece 18b.

As will be described in greater detail below, with description generally being confined to the invention as it relates to eyepiece 18a for sake of simplicity, a viewing angle of eyepiece 18a may be selectively adjusted to angle A1 or angle A2 using an adjustment apparatus formed in accordance with the present invention and designated generally as 20. Apparatus 20, further illustrated in FIG. 3, generally comprises an eyepiece tube 22, optical means 24, and means 26 for rotatably mounting the eyepiece tube on microscope body 12.

Figure 3:
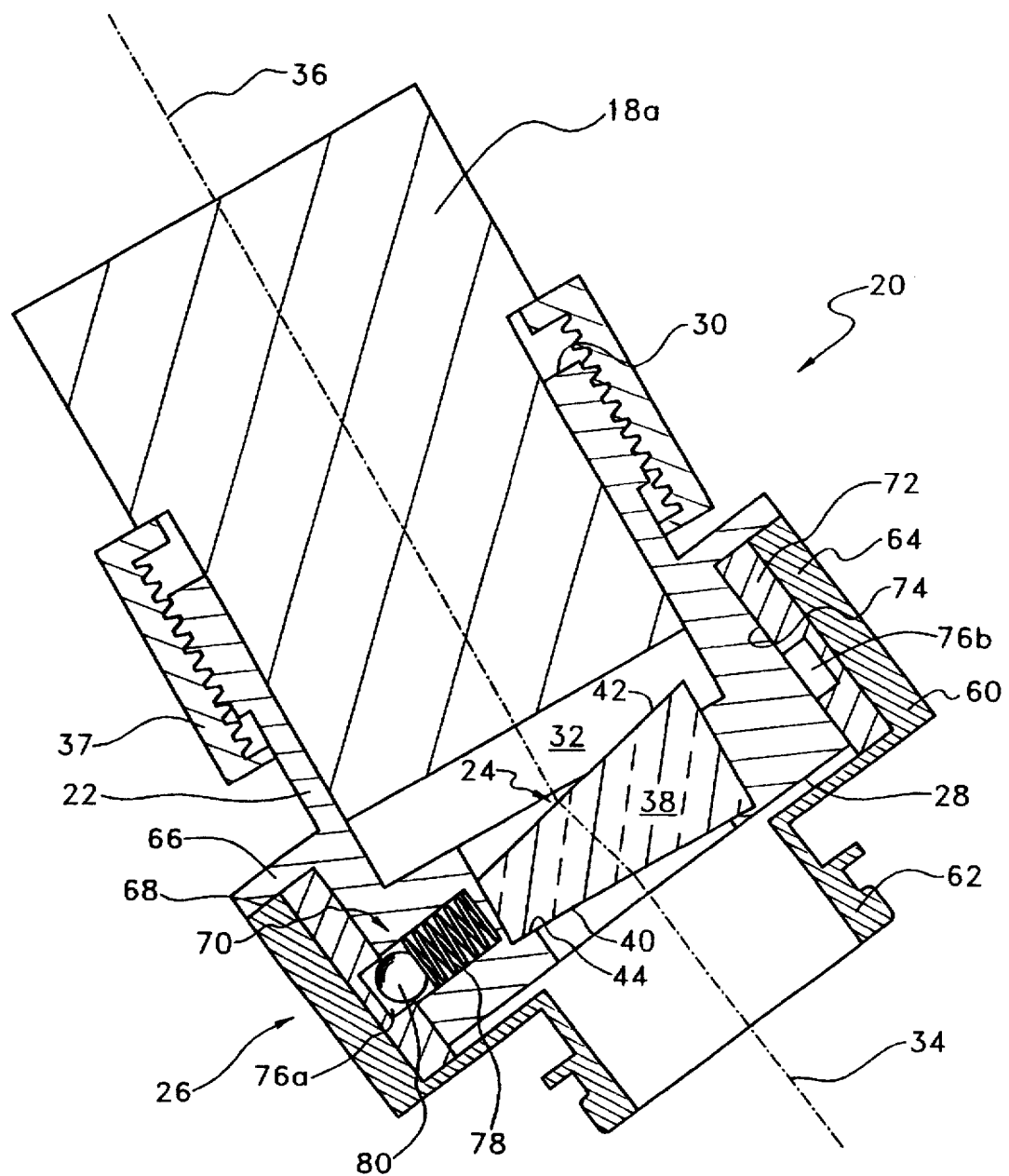
FIG. 3 is a sectional view of the preferred embodiment viewing angle adjustment apparatus of the present invention taken generally along the line 3—3 in FIG. 2.

As best shown in FIG. 3, eyepiece tube 22 is a bent tube having a light entry end 28 and a light exit end 30 communicating with each other via passageway 32 which extends along a first optical axis 34 associated with entry end 28 and changes direction to extend along a second optical axis 36 associated with exit end 30. Consequently, axes 34 and 36 form an oblique angle B identified in FIG. 1. Passageway 32 is sized at exit end 30 to slidably receive magnifying eyepiece 18a such that the eyepiece is aligned on second optical axis 36, and a threaded sleeve 37 at exit end 30 permits axial adjustment of eyepiece 18a along second optical axis 36.

In a preferred embodiment, optical means 24 comprises a prism 38 fixed within passageway 32 and having a first refracting surface 40 and a second refracting surface 42 for redirecting the object image from first optical axis 34 to second optical axis 36. An internal step 44 is provided in eyepiece tube 22 at entry end 28 to support and position prism 38 with first refracting surface 40 and second refracting surface 42 properly orientated relative to first optical axis 34 and second optical axis 36, respectively. It is contemplated to provide prism 38 as a cemented assembly, for example an achromatic wedge. Prism 38 may be secured by adhesive or other suitable means for rotation with eyepiece tube 22.

Figure 4:
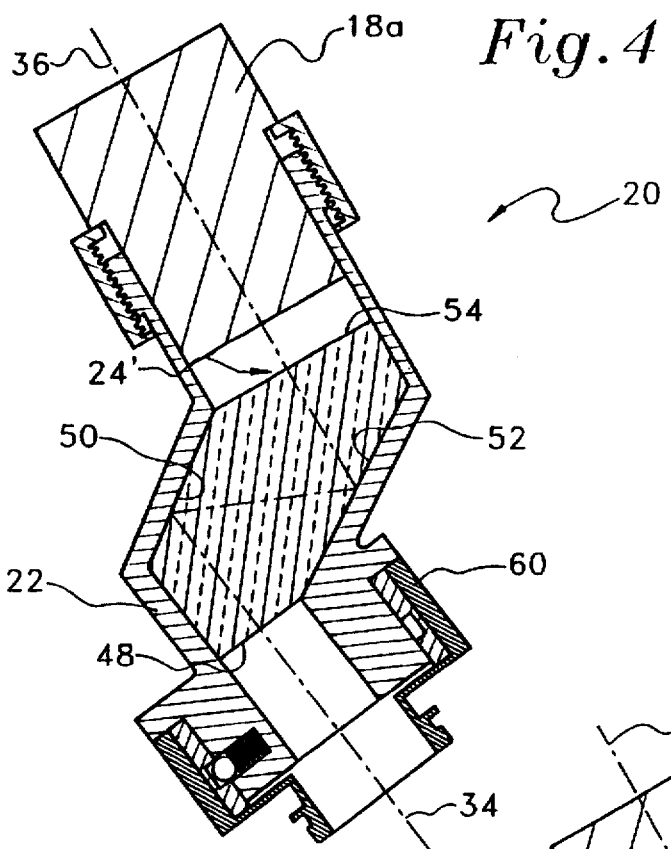
FIGS. 4 and 5 are views similar to that of FIG. 3 showing additional embodiments having alternative optical means.

While prism 38 having dual refracting surfaces is described above with regard to optical means 24, other optical elements may be substituted therefor. FIG. 4 depicts an additional embodiment having alternative optical means 24' comprising a prism 46 having an entry surface 48, a first internally reflecting surface 50, a second internally reflecting surface 52, and an exit surface 54. Entry surface 48 and exit surface 54 are aligned normal to first optical axis 34 and second optical axis 36, respectively, such that the object image passes straight through entry surface 48 along first optical axis 34, is successively reflected by first and second reflecting surfaces 52, and passes straight through exit surface 54 along second optical axis 36 on its way to eyepiece 18a.

Figure 5:
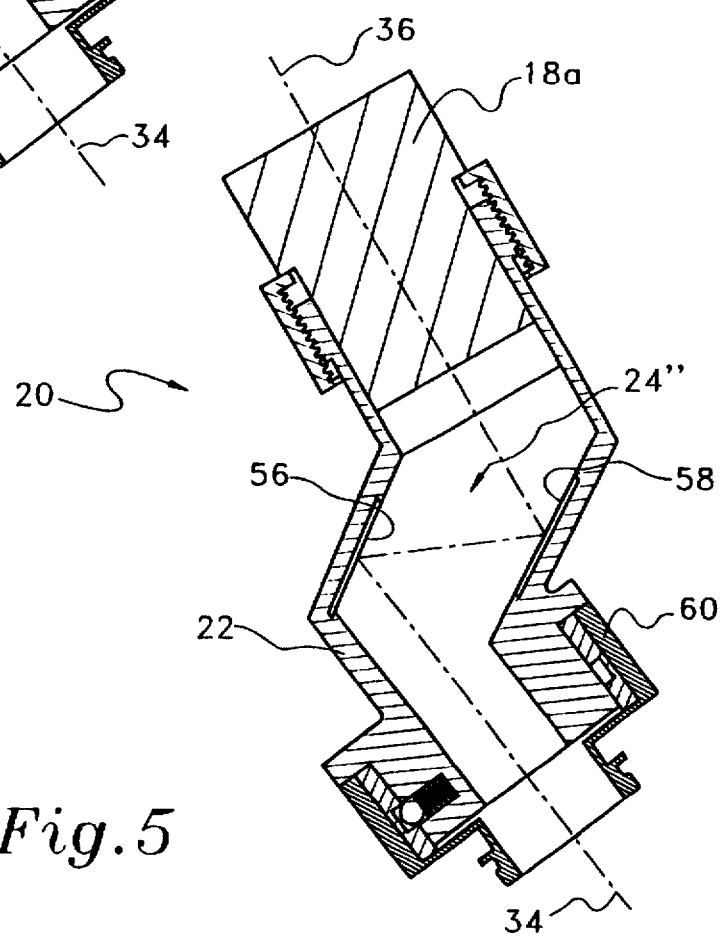

Another embodiment having alternative optical means 24" is shown in FIG. 5 and comprises a first mirror 56 aligned on first optical axis 34 and a second mirror 58 aligned on second optical axis 36. As will be understood, mirrors 56 and 58 operate in a manner similar to internally reflecting surfaces 50 and 52 of previously described optical means 24'.

Referring once again to FIG. 3, eyepiece tube 22 is mounted on microscope body 12 by an annular collar 60 for rotation about first optical axis 34, with first optical axis 34 being arranged to coincide with the optical path followed by the object image. Collar 60 includes a first portion 62 suitably adapted for attachment to body 12 and a second portion 64 sized to slidably receive entry end 28 of eyepiece tube 22. Eyepiece tube 22 includes an annular flange 66 arranged for engagement with an end 68 of second portion 64 to limit the extent insertion of entry end 28 within second portion 64 and thus determine an axial position of the eyepiece tube relative to collar 60.

Detent means 70 is provided for releasably securing eyepiece tube in a plurality of predetermined rotational positions about first optical axis 34. In the preferred embodiment, a bushing 72 inserted within second portion 64 defines an inner wall 74 having a pair of angularly spaced recesses 76a and 76b therein, and a spring plunger 78 carried by eyepiece tube 22 includes a rounded plunger head 80 biased for engagement with a particular recess 76a or 76b incident to alignment therewith. Bushing 72 may of course be omitted and inner wall 74 provided integrally with a second portion 64, as shown in FIG. 3A. Recesses 76a and 76b are located 180 degrees opposite each other in cross-sectional plane 3—3, shown in FIG. 2 as bisecting eyepiece 18a into left and right halves, with recess 76a being in a rear position and recess 76b being in a front position. Spring plunger 78 is arranged to act in a line of biasing force coplanar with second optical axis 36, such that when plunger head 80 is aligned with either recess 76a or 76b, eyepiece tube 22 will be releasably secured in a rotational position wherein second optical axis 36 is coplanar with bisectional plane 3—3. When plunger head 80 engages recess 76a, the viewing angle of microscope 10 corresponds to angle A1. When plunger head 80 engages opposite recess 76b, the viewing angle corresponds to angle A2. The present invention therefore enables a user to quickly and easily select a viewing angle A1 or A2 by rotating eyepiece tube 22 about first optical axis 34 until detent means 70 acts to secure the eyepiece tube in an appropriate rotational position. As will be appreciated, viewing angles A1 and A2 differ by twice the angle B formed by first and second optical axes 34 and 36. In the preferred embodiment, viewing angle A1 measures 60 degrees, viewing angle A2 measures 45 degrees, and angle B measures 7.5 degrees, however other angles are of course possible. Consequently, the present invention avoids use of more severe optical means, i.e. optical means whereby the angle B must equal the sought after difference in viewing angle A1 minus A2, with the advantage that aberrations and image distortion are mitigated.

The preferred embodiment apparatus disclosed herein is contemplated for attachment to microscope body 12 via collar 60. In this regard, it may be desirable for a user to possess a plurality of attachable apparatus according to the present invention each enabling a different pair of viewing angles A1 and A2. Alternatively, it may in some instances be desirable to make collar 60 integral with body 12 such that the apparatus is permanently attached to the microscope.

It will be understood that where microscope 10 is a stereomicroscope, apparatus 20 is provided in connection with eyepiece 18b in addition to eyepiece 18a. Eyepiece 18b is associated with a third optical axis 82 similar to first optical axis 34 and converging therewith, and a fourth optical axis (not shown) similar to second optical axis 36. To change the viewing angle of microscope 10, both viewing tubes 22 must be rotated about their respective rotational axes, namely first axis 34 and third axis 82.

Those skilled in the art will recognize that equivalents may be substituted for various mechanical and optical features of the preferred embodiment disclosed herein without straying from the scope of the present invention as defined by the claims below.

What is claimed is:

1. A viewing angle adjustment apparatus for a microscope comprising:

an annular collar adapted for mounting on a body of said microscope;

an eyepiece tube having a light entry end received by said collar for rotation relative to said microscope body about a first optical axis which coincides with an optical path of said microscope and is non-vertical, and a light exit end communicating with said light entry end, said exit end being sized to slidably mount a magnifying eyepiece in alignment with a second optical axis not parallel to said first optical axis; and optical means fixed within said eyepiece tube for rotation therewith, said optical means receiving an object image transmitted along said first optical axis and redirecting said object image along said second optical axis to said magnifying eyepiece.

2. The apparatus according to claim 1, wherein said annular collar includes a first portion adapted for attachment to said microscope body and a second portion adapted for slidably receiving said entry end of said eyepiece tube.

3. The apparatus according to claim 2, further comprising detent means for releasably securing said eyepiece tube in a plurality of predetermined rotational positions about said first optical axis.

4. The apparatus according to claim 3, wherein said plurality of predetermined rotational positions comprises a pair of rotational positions 180 degrees opposite each other, whereby said second optical axis is coplanar with a vertical bisectional plane through said eyepiece when said eyepiece tube is secured in either of said pair of rotational positions.

5. The apparatus according to claim 4, wherein said viewing angle is 45 degrees from horizontal when said eyepiece tube is in one of said pair of rotational positions and 60 degrees from horizontal when said eyepiece tube is in another of said pair of rotational positions.

6. The apparatus according to claim 2, wherein said eyepiece tube includes an annular flange arranged to engage an end of said second portion for determining an axial position of said eyepiece tube relative to said collar when said entry end is received within said second portion.

7. The apparatus according to claim 1, further comprising detent means for releasably securing said eyepiece tube in a plurality of predetermined rotational positions about said first optical axis.

8. The apparatus according to claim 1, wherein said optical means is a prism having first and second refracting surfaces for redirecting said object image from said first optical axis to said second optical axis.

9. The apparatus according to claim 8, wherein said prism is an achromatic wedge.

10. The apparatus according to claim 1, wherein said optical means is a prism having first and second internally reflecting surfaces for redirecting said object image from said first optical axis to said second optical axis.

11. The apparatus according to claim 1, wherein said optical means comprises first and second mirrors for redirecting said object image from said first optical axis to said second optical axis.

12. In a microscope having an optical path system for delivering an object image along an optical path to a magnifying eyepiece, the improvement comprising:

an annular collar;

an eyepiece tube having a light entry end received by said collar for rotation relative to said microscope body about a first optical axis which coincides with said optical path of said microscope and is non-vertical, and a light exit end communicating with said light entry end, said exit end being sized to slidably mount a magnifying eyepiece in alignment with a second optical axis not parallel to said first optical axis; and optical means fixed within said eyepiece tube for rotation therewith, said optical means redirecting said object image from said first optical axis to said second optical axis on which said eyepiece is aligned, said second optical axis forming an oblique angle with said first optical axis.

13. The improvement according to claim 12, further comprising detent means for releasably securing said eyepiece tube in a plurality of predetermined rotational positions about said first optical axis.

14. The apparatus according to claim 13, wherein said plurality of predetermined rotational positions comprises a pair of rotational positions 180 degrees opposite each other, whereby said second optical axis is coplanar with a plane bisecting said eyepiece into left and right halves when said eyepiece tube is secured in either of said pair of rotational positions.

15. The improvement according to claim 12, wherein said optical means is a prism having first and second refracting surfaces for redirecting said object image from said first optical axis to said second optical axis.

16. The apparatus according to claim 15, wherein said prism is an achromatic wedge.

17. The improvement according to claim 12, wherein said optical means is a prism having first and second internally reflecting surfaces for redirecting said object image from said first optical axis to said second optical axis.

18. The improvement according to claim 12, wherein said optical means comprises first and second mirrors for redirecting said object image from said first optical axis to said second optical axis.

* * * * *